United States Patent
Zhu et al.

(10) Patent No.: US 12,010,666 B2
(45) Date of Patent: *Jun. 11, 2024

(54) MULTI-CHANNEL TIME-DIVISION MULTIPLEXING ACCESS METHODS AND SYSTEMS

(71) Applicant: TrellisWare Technologies, Inc., San Diego, CA (US)

(72) Inventors: Hua Zhu, San Diego, CA (US); Cenk Köse, San Diego, CA (US)

(73) Assignee: TRELLISWARE TECHNOLOGIES, INC., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/177,263

(22) Filed: Mar. 2, 2023

(65) Prior Publication Data

US 2023/0217423 A1 Jul. 6, 2023

Related U.S. Application Data

(62) Division of application No. 17/006,644, filed on Aug. 28, 2020, now Pat. No. 11,601,935.

(51) Int. Cl.
*H04W 72/0446* (2023.01)
*H04J 3/02* (2006.01)

(52) U.S. Cl.
CPC ........... *H04W 72/0446* (2013.01); *H04J 3/02* (2013.01)

(58) Field of Classification Search
CPC .............................. H04W 72/0446; H04J 3/02
USPC ........................................................ 370/336
See application file for complete search history.

(56) References Cited

U.S. PATENT DOCUMENTS

| | | | |
|---|---|---|---|
| 10,038,518 B1* | 7/2018 | Sun | H04L 27/2603 |
| 2010/0157959 A1* | 6/2010 | Hiben | H04W 72/04 370/337 |
| 2010/0226645 A1* | 9/2010 | van der Wateren | H04W 56/002 370/252 |
| 2014/0112352 A1* | 4/2014 | Li | H04L 69/161 370/474 |

(Continued)

FOREIGN PATENT DOCUMENTS

WO 2013105085 A1 7/2013

OTHER PUBLICATIONS

International Search Report and Written Opinion dated Jan. 19, 2022 for International Patent Application No. PCT/US21/48058, 14 pages.

*Primary Examiner* — Faisal Choudhury
(74) *Attorney, Agent, or Firm* — Perkins Coie LLP (57) ABSTRACT

Devices, systems and methods for high-utilization low-latency multi-channel time-division multiplexing access (TDMA) are described. One example method for wireless communication includes performing, in a first time interval of a time-division multiple access (TDMA) slot, a transmission of a first data unit over a first logical channel of the plurality of logical channels, refraining from transmitting, subsequent to a completion of the transmission of the first data unit, for a second time interval immediately after the first time interval, and performing (N−1) transmissions in (N−1) time intervals for each data unit of (N−1) subsequent data units in the TDMA slot, such that a transmission of an nth data unit of the (N−1) subsequent data units is performed over an nth logical channel of the plurality of logical channels.

20 Claims, 8 Drawing Sheets

(56) References Cited

U.S. PATENT DOCUMENTS

| | | | |
|---|---|---|---|
| 2018/0005154 A1* | 1/2018 | Needham | G06Q 30/0206 |
| 2018/0324835 A1 | 11/2018 | Agiwal et al. | |
| 2019/0098625 A1 | 3/2019 | Johnson et al. | |
| 2019/0110285 A1* | 4/2019 | Huang | H04W 72/0446 |
| 2019/0199431 A1 | 6/2019 | Speidel et al. | |
| 2019/0260566 A1 | 8/2019 | Fehrenbach et al. | |
| 2020/0344032 A1* | 10/2020 | Yang | H04L 5/0053 |
| 2021/0368523 A1* | 11/2021 | Yoshioka | H04W 72/0446 |

\* cited by examiner

MULTI-CHANNEL TIME-DIVISION MULTIPLEXING ACCESS METHODS AND SYSTEMS

PRIORITY CLAIM

This application is a division of U.S. patent application Ser. No. 17/006,644 filed Aug. 28, 2020, the entire content is incorporated by reference in its entirety.

TECHNICAL FIELD

This document is directed to collaborative wireless communications amongst nodes in a wireless network.

BACKGROUND

In certain wireless communication applications, signals traveling between nodes can encounter long propagation delay. For an example, using geosynchronous satellites to communicate between mobile stations and base stations across a continent may result in hundreds of milliseconds of delay. In another example, the propagation delay of an underwater acoustic channel across the depth of an ocean can be many seconds. Traditional time-slotted medium access control (MAC) schemes trade-off channel utilization to accommodate these large propagation delays. Enabling high-utilization and low-latency communication in these channels can significantly expand emerging communication capabilities.

SUMMARY

This document relates to high-utilization low-latency multi-channel time-division multiplexing access (TDMA). Embodiments of the disclosed technology can be configured to provision multiple bursts over multiple orthogonal radio resources during a single TDMA slot, which advantageously increases the link utilization and reduces timing uncertainties.

In an exemplary aspect, a method for wireless communication over a wireless medium comprising a plurality of logical channels is disclosed. The method includes performing, in a first time interval of a time-division multiple access (TDMA) slot, a transmission of a first data unit over a first logical channel of the plurality of logical channels, refraining from transmitting, subsequent to a completion of the transmission of the first data unit, for a second time interval immediately after the first time interval, and performing (N−1) transmissions in (N−1) time intervals for each data unit of (N−1) subsequent data units in the TDMA slot, such that a transmission of an nth data unit of the (N−1) subsequent data units is performed over an nth logical channel of the plurality of logical channels, wherein n and N are positive integers and 2≤n≤N, wherein each of the plurality of logical channels corresponds to a distinct transmission resource, wherein the wireless medium is characterized by a maximum propagation delay, and wherein a duration of the TDMA slot is greater than the maximum propagation delay.

In another exemplary aspect, a method for wireless communication over a wireless medium comprising a plurality of logical channels is disclosed. The method includes receiving and detecting, at a first time in a time-division multiple access (TDMA) slot, a first data unit over a first logical channel of the plurality of logical channels, and receiving and detecting at least one of (N−1) subsequent data units at each of (N−1) times in the TDMA slot, such that a reception of an nth data unit of the (N−1) subsequent data units is performed over an nth logical channel of the plurality of logical channels, wherein n and N are positive integers and 2≤n≤N, wherein each of the plurality of logical channels corresponds to a distinct transmission resource, wherein the wireless medium is characterized by a maximum propagation delay, and wherein a duration of the TDMA slot is greater than the maximum propagation delay.

In yet another exemplary aspect, a wireless communication system is disclosed. The system includes a transmitter, a first receiver coupled to the transmitter over a wireless medium comprising a plurality of logical channels, wherein each of the plurality of logical channels corresponds to a distinct transmission resource, wherein the wireless medium is characterized by a maximum propagation delay, and wherein a distance between the transmitter and the first receiver corresponds to a first propagation delay that is less than the maximum propagation delay, and a second receiver coupled to the transmitter over the wireless medium, wherein a distance between the transmitter and the second receiver corresponds to a second propagation delay that is less than the first propagation delay, wherein the transmitter is configured to perform, in a first time interval of a time-division multiple access (TDMA) slot, a transmission of a first data unit over a first logical channel of the plurality of logical channels to the first receiver and the second receiver, refrain from transmitting, subsequent to a completion of the transmission of the first data unit, for a second time interval immediately after the first time interval, and perform (N−1) transmissions in (N−1) time intervals for each data unit of (N−1) subsequent data units in the TDMA slot, such that a transmission of an nth data unit of the (N−1) subsequent data units is performed over an nth logical channel of the plurality of logical channels, wherein the second receiver is configured to receive and decode, within the TDMA slot, at least one of the N subsequent data units, wherein the first receiver is unable to receive and decode each of the N subsequent data units, wherein a duration of the TDMA slot is greater than the first propagation delay, and wherein n and N are positive integers and 2≤n≤N.

In yet another exemplary aspect, the above-described methods are embodied in the form of processor-executable code and stored in a computer-readable program medium.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

Propagation delay is the amount of time it takes a communication signal to travel from the source to the destination over a given transmission medium, i.e., $D_p=d/c$, where $D_p$ is the propagation delay, d is the distance between the source and the destination, and c is the speed of the signal. In most terrestrial wireless systems, such as mobile cellular and WiFi networks, the propagation delay is typically small compared to the packet size, and the effects of propagation delay can be mitigated using techniques such as guard periods. However, using a guard time in systems with long propagation delays (e.g., underwater acoustic channels, satellite communications, etc.) results in poor channel utilization. Furthermore, configuring a system to use the worst-case round-trip time (RTT) produces significant inefficiencies for devices in the system that have RTTs that are smaller than the worst-case RTT. Embodiments of the disclosed technology enable high-utilization and low-latency communication in time-slotted networks over channels with long propagation delays.

Some embodiments described herein are directed towards single-hop and multi-hop, time-slotted wireless networks. That is, a wireless network that may implement a time-division multiple access (TDMA) scheme that divides a unit of time, e.g., one second, into slots, each of which are dedicated for the transmissions and reception of messages from nodes that may be multiple hops from each other.

Figure 1A:
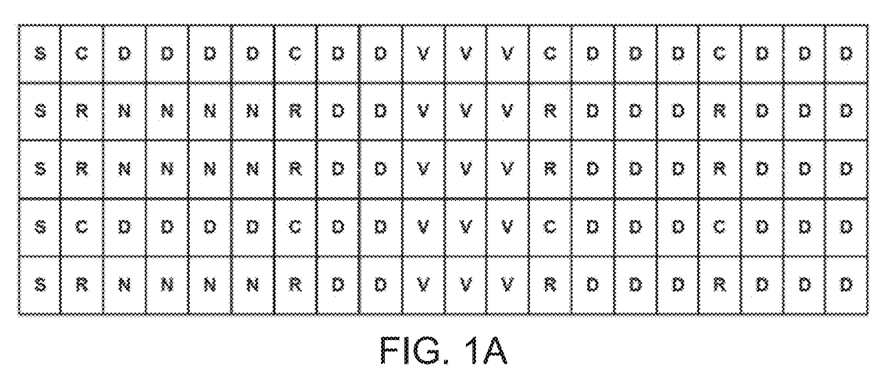
FIGS. 1A, 1B and 1C illustrative slot assignments for multi-hop networks.
Figure 1B:
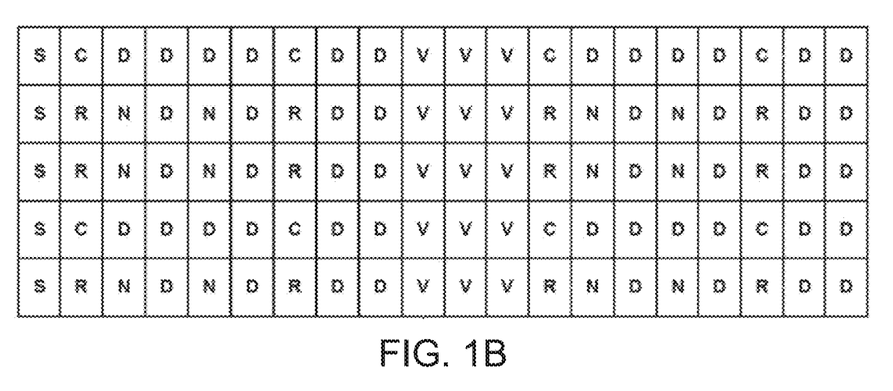
Figure 1C:
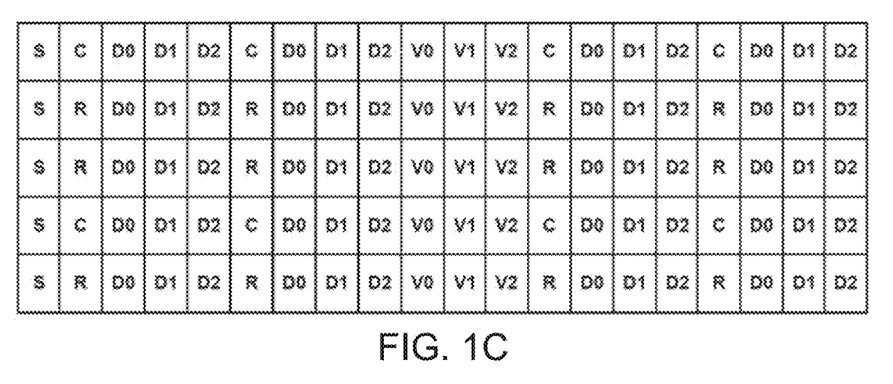

In an example, the representative slot assignments shown in FIGS. 1A, 1B and 1C define virtual channels for different types of messages including synchronization, data and voice messages. Table 1 provides a legend for some of the types of slots assigned within a frame.

TABLE 1

| Logical channels used in slot assignments | |
|---|---|
| S | Synchronization logical channel |
| C | Clear-to-send logical channel |
| R | Request-to-send logical channel |
| N | Network maintenance logical channel |
| D | Data logical channel |
| V | Voice logical channel |

Figure 2:
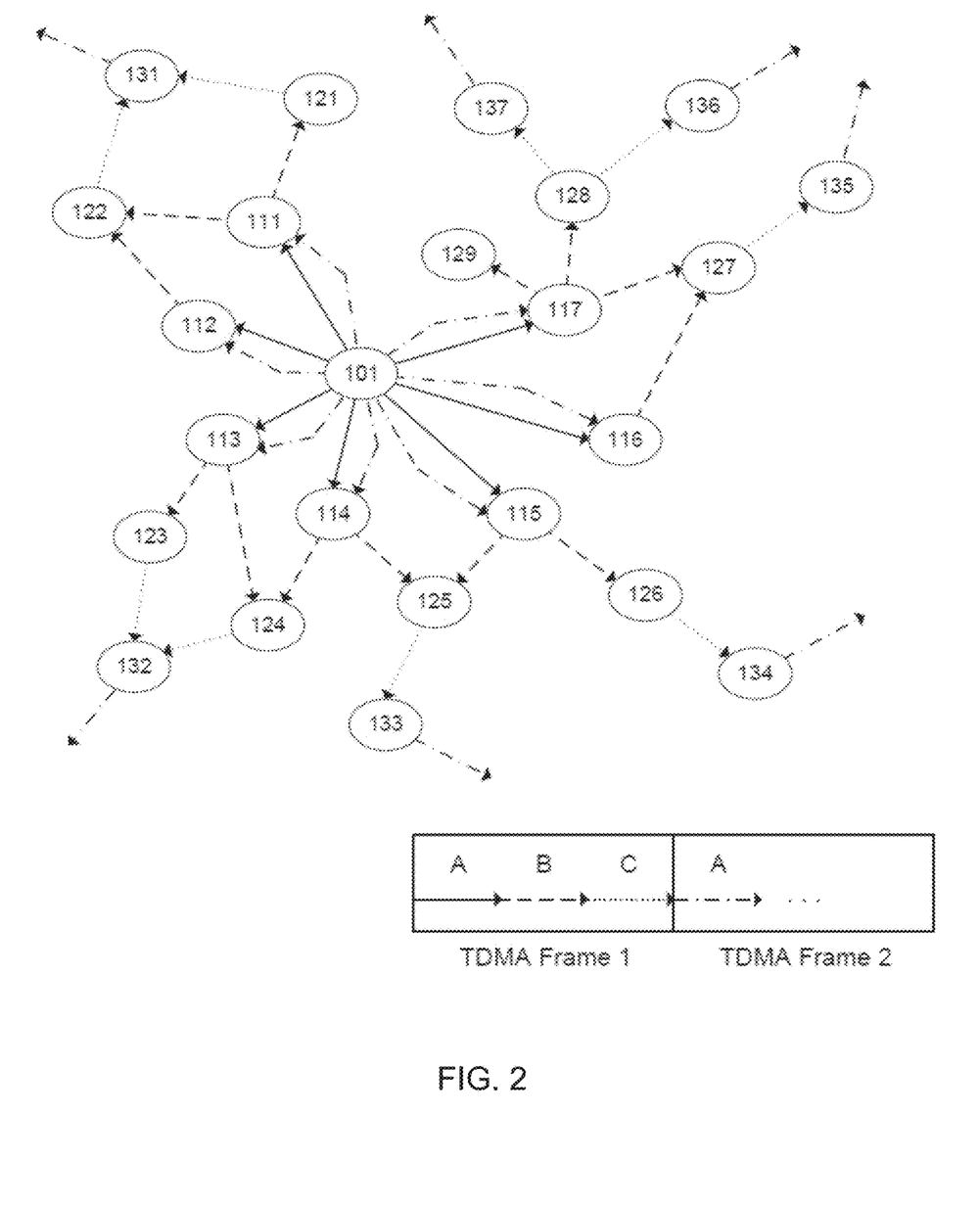
FIG. 2 shows an example of a broadcast flooding protocol for barrage relay networks.

A Barrage Relay Network (BRN), which is an example of a time-slotted, multi-hop wireless network, is shown in FIG. 2. The BRN in FIG. 2 illustrates a wireless network where independent medium allocations are obtained via a TDMA scheme. While BRNs can be defined according to various medium allocation schemes (e.g., time-slotting, different frequency channels, different frequency-hopping patterns, different antenna radiation patterns, low cross-correlation spreading sequences, and the like), embodiments of the disclosed technology are described in the context of a time-slotted barrage relay network but are intended to be applicable to other medium allocation schemes.

In particular, time is divided into frames, which are further divided into multiple slots per frame (for example, FIG. 2 employs 3 slots per frame labeled "A," "B" and "C"). The data that is transmitted in a given time slot is denoted a "packet." Two packets that are transmitted by two different nodes are said to be identical if all data—including all protocol header information—contained in the respective packets is identical.

In an embodiment, for example, a central node 101 transmits a packet on slot A of the first TDMA frame. All nodes that successfully receive this packet are, by definition, one hop away from the source. These nodes are labeled 111-117 in FIG. 2. These nodes transmit the same packet on slot B, thus relaying to nodes that are two hops away from the source (nodes 121-129), which in turn transmit the same packet on slot C. Nodes that are three hops away from the source node (nodes 131-137) relay the packet on slot A of the second TDMA frame. Thus, packets transmit outward from the source via a decode-and-forward approach.

In the embodiment shown in FIG. 2, a number of two-hop nodes receive the same packet from different one-hop nodes. These packets do not collide due to the physical (PHY) layer processing employed by BRNs. In particular, BRNs employ a PHY layer that allows identical packets to be combined at the receiver in a manner analogous to multipath mitigation in traditional radio receivers. That is, the multiple, time-shifted copies of the received signal that arise in BRNs can be interpreted at the receiver as resulting not from different transmitting nodes, but from reflections off, for example, buildings when a single source transmits.

In order for two packets to be identical, both the payload data and all protocol header data must be identical. Therefore, protocol headers in a barrage relay network can be modified only in a manner that is common across all nodes at a given hop distance from the source. This is in stark contrast to traditional layered network architectures that employ a point-to-point link abstraction at Layer 2, wherein protocol headers can be modified in a node-specific—as opposed to a hop-specific—manner.

In some embodiments, the spatial reuse of time slots enables packets to be pipelined into the source for transmission every three slots. Specifically, as shown in FIG. 2, the one-hop nodes will not receive the packet broadcast by the three-hop nodes during slot A of the second TDMA frame. Thus, the source can safely transmit a second packet during that slot. In this manner, a throughput of W/3 can be achieved for broadcast in a single-source BRN (wherein W is the capacity of a single point-to-point link). This efficient injection of messages for broadcast transmission is denoted "spatial pipelining" in order to highlight its reuse of time slots between spatially separated nodes.

More generally, spatial pipelining can be achieved by having a source node inject a new packet for every barrage relay broadcast every M slots resulting in a throughput of W/M. In this context, M is referred to as the spatial pipelining factor (SPF). In some embodiments, when the size of an arbitrary wireless network is not known to the source a priori, M must be at least 3 to avoid collisions. Larger spatial pipelining factors (e.g., 4) may be chosen in order to enhance robustness in highly mobile network topologies.

Furthermore, in order to contain the extent of a given barrage relay transmission, two fields can be incorporated into the header (preamble) of each data packet: a time-to-live (TTL) field and a hop count (HC) field. The TTL field is unchanged by relaying nodes while the HC field is initially set to 1 by the source of the packet and incremented upon relay. In the context of FIG. 2, the central node 101 may set the TTL field to 8, and enable the packet to propagate over 8 hops through the BRN. The one-hop neighbors of this central node would receive such packets and relay a modified packet with the HC field set to 2. Similarly, two-hop neighbors set the HC to 3, and so on. Relaying continues whenever a received packet has an HC field that is less than or equal to the TTL field, but stops if this condition cannot be satisfied.

Although the description of the interaction between the TTL and HC fields is in the context of BRNs, the notion of increasing the HC field upon relaying and stopping the relaying process when a packet with equal TTL and HC fields is received is not limited to BRNs, and is in general compatible with other wireless networks. For example, a time-slotted multi-hop network that comprises a single node at each hop can support the interaction between the TTL and HC, as well as spatial pipelining, in the manner described above.

In time-slotted networks (e.g., a BRN described above), TDMA-based MACs may be configured to employ a slot guard time to overcome propagation delay and timing reference-error to avoid overlap of two consecutive signals between two consecutive TDMA slots at a receiver. Typically, the propagation time is the dominant source of timing uncertainty, and the slot guard time is provisioned based on the maximum propagation delay of the link.

In terrestrial RF communications, the link propagation delays (100 μsec for 30 km) are typically small compared to signal transmission (burst) time (hundreds of microseconds to milliseconds), therefore the relative overhead due to slot guard-time is manageable. However, there are applications for which long propagation delays are unavoidable. For example, line-of-sight airborne networks may operate over link distances of many hundreds of kilometers, for which milliseconds of guard time may be necessary. Underwater acoustic communications (UWAC) is also subject to large propagation delays due to relatively slow speed of propagation of waves (~1.5 km/sec), translating to seconds of delay (e.g., to cover multiple kms spanning the ocean depth).

Figure 3A:
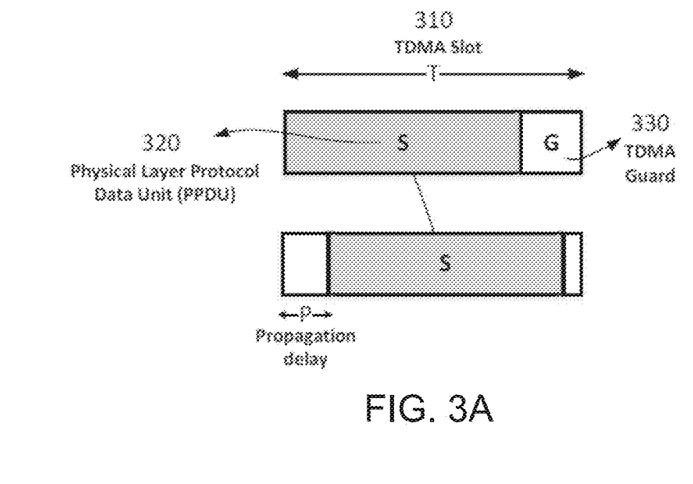
FIGS. 3A, 3B and 3C show examples of TDMA slot utilizations.
Figure 3B:
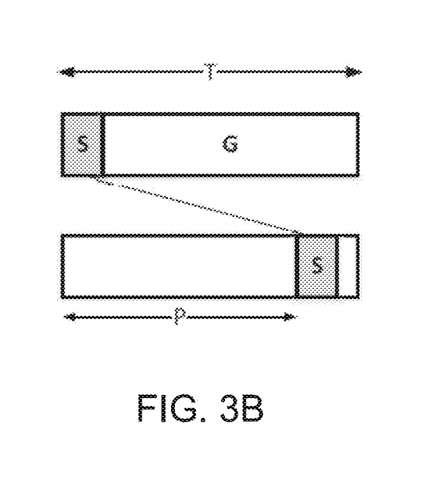
Figure 3C:
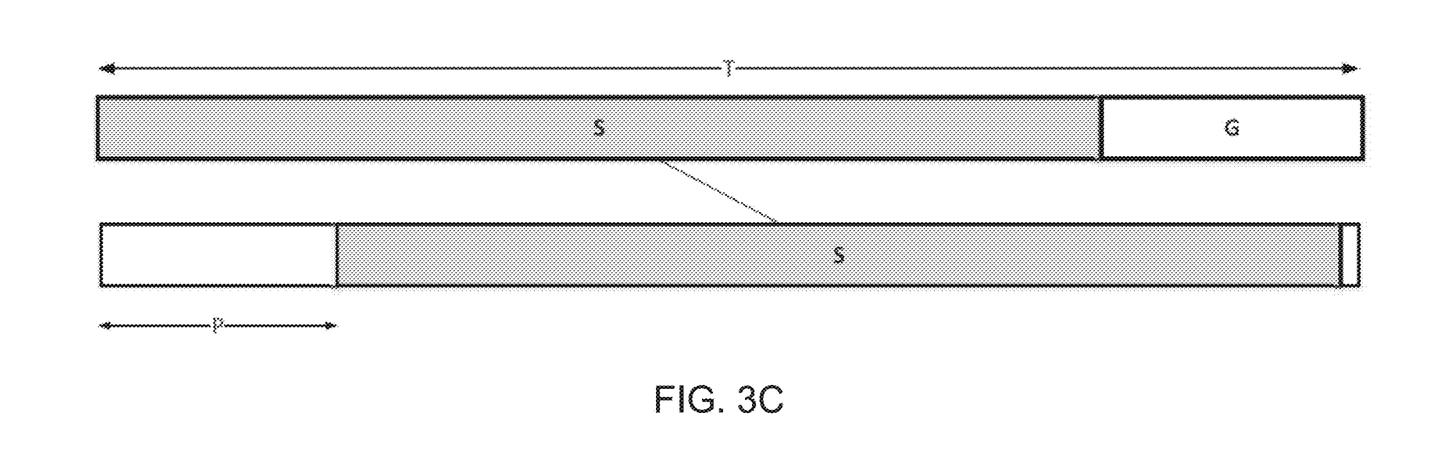

FIGS. 3A, 3B and 3C illustrate examples of TDMA slot allocations. As shown in FIG. 3A, the TDMA slot (310) has signal duration S (320), maximum propagation delay P (330), and slot guard time G (340), where G>P. In this example framework, the slot-level channel utilization, U, is determined as:

$$U = \frac{S}{T} = \frac{S}{S+G} \sim 1 - \frac{P}{S+P}.$$

The slot-level latency, L, is determined as:

$$L \sim T = S + G \sim S\left(1 + \frac{P}{S}\right).$$

In some embodiments, the MAC layer system utilization and latency are proportional to the slot-level system utilization and latency metrics, respectively. In general, a smaller S and a smaller P/S ratio are desirable for a TDMA MAC.

FIG. 3A illustrates an example TDMA scheme with a small P (compared to the signal duration, S) that operates with high efficiency and low latency. FIG. 3B illustrates another example TDMA scheme with a large P (compared to the TDMA slot length, T) and operates with comparable latency but lower utilization. FIG. 3C illustrates yet another TDMA scheme with a large P with comparable utilization but high latency. The traditional TDMA schemes are therefore subject to a trade-off between utilization and latency for large P.

In some embodiments, and for scenarios with large propagation delay, random access MAC solutions may be implemented to improve the channel utilization, but this comes at the expense of the desirable attributes of TDMA.

The present document uses terminology that includes physical layer protocol data units (PPDUs) and interframe spacing (IFS) only to facilitate understanding and the disclosed techniques, and embodiments may be practiced in other wireless systems that use physical layer bursts and inter-burst spacing.

Embodiments of the disclosed technology are directed to, for example, communication systems subject to high propagation delay, and may be configured to achieve high channel utilization and low latency (down to the signal duration, S) by provisioning multiple physical layer protocol data units (PPDUs) (or more generally, multiple bursts) over multiple orthogonal radio resources during the TDMA slot. The radio resources here are referred to as channels or logical channels. In an example, the logical channel may be configured in frequency, in space (antenna directivity), in polarization, or in code domains.

According to the described embodiments, high utilization and low latency can be achieved irrespective of how slots are organized and utilized at the TDMA frame level, and the described methods and techniques can be applied to existing radios with a single half-duplex transceiver (that enables the radio to either transmit or receive, but not both at the same time).

In some embodiments, the sender of a TDMA slot transmits the first PPDU using a primary channel. Instead of idling for the remaining channel time within the transmitting slot, the sender switches to one or more secondary channels to transmit additional PPDUs, each separated in time by a predefined interframe spacing (IFS), long enough to accommodate the time for transmitter and/or receivers to switch from one channel to another. All transmitted PPDUs are fully contained within the current TDMA slot. The larger the maximum propagation delay (P), the larger the TDMA slot, and therefore the more PPDUs may be transmitted within the single TDMA slot. From the perspective of this transmitter, the previously unutilized guard time is fully utilized for dissemination of information in the additional PPDUs.

In some embodiments, one or more specific logical channels in the BRN can be used to transmit multiple PPDUs as described in the embodiments herein, and other logical channels could be used as originally designed. In an example, multiple PPDUs may be transmitted in the frames associated with only a synchronization logical channel (e.g., "S" in FIG. 1A), and the other channels can be used for data (e.g., "D" in FIG. 1A), voice (e.g., "V" in FIG. 1A), etc.

In some embodiments, the receivers of a TDMA slot always tune to the primary channel and look for the first PPDU at the start of the TDMA time slot. Upon receiving the first PPDU, each receiver evaluates the time-of-arrival (TOA) and independently decides whether it shall switch to the secondary channel(s) for receiving the subsequent PPDU (s). If the TOA of the primary PPDU is too late, (due to the time offset with respect to the sender and the propagation delay), a specific receiver may decide to remain on the primary channel and prepare for the upcoming activity in the next time slot. Similarly, each receiver may independently decide to receive all or a subset of the subsequent PPDU(s) based on its local timeline.

Figure 4:
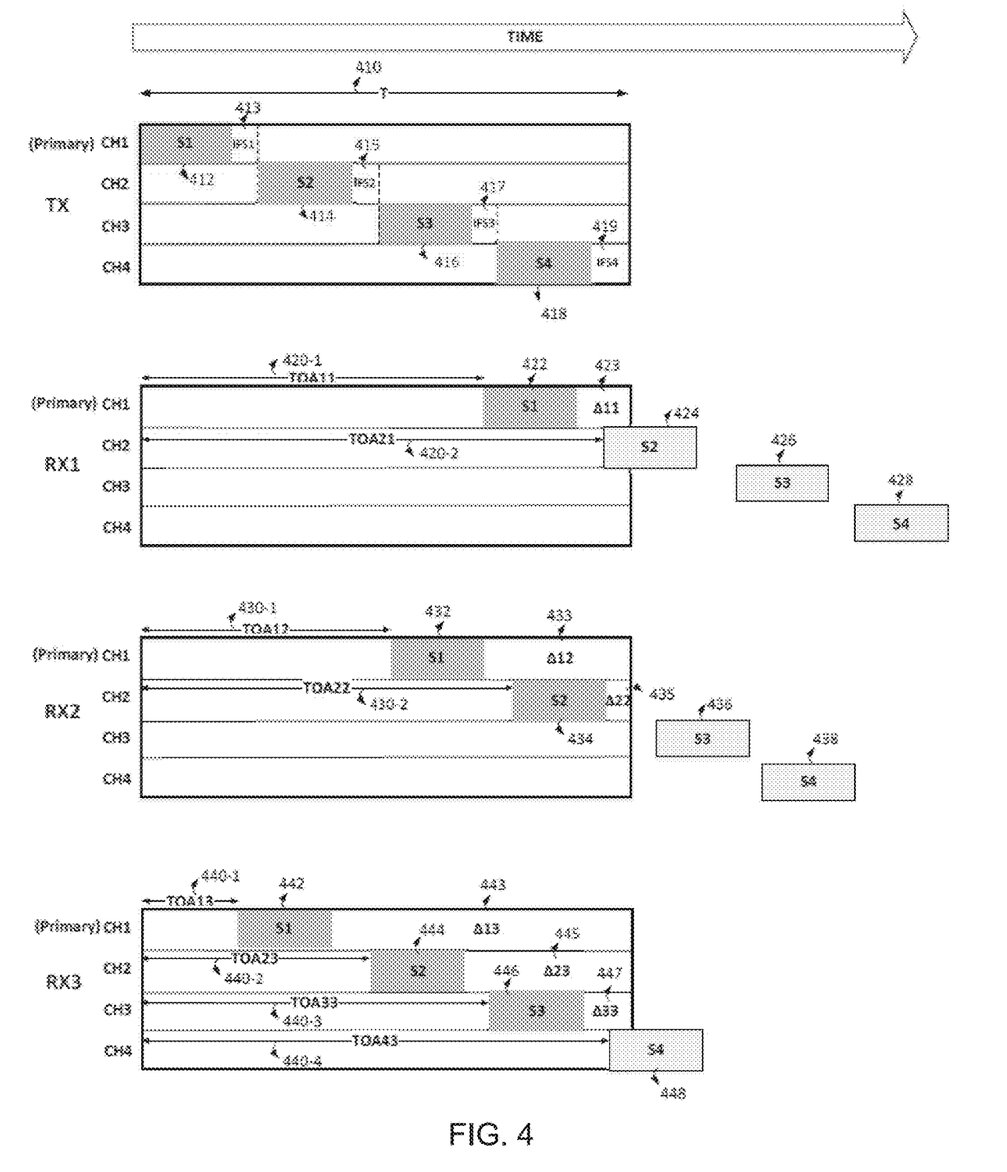
FIG. 4 shows an example of a transmitter and multiple receivers using multiple channels in a single TDMA slot.

FIG. 4 illustrates an example embodiment of the described technology configured for a transmitter (TX) and multiple receivers (RXn). The transmitter sends a TDMA slot of length T (410) by transmitting a first PPDU (412) in the primary channel (CH1), followed by one or more PPDUs (414, 416, 418) on alternate channels (CH2, CH3 and CH4, respectively). The nth PPDU, denoted by Sn, is followed by an interframe spacing IFSn (413, 415, 417 and 419 for n=1, 2, 3 and 4, respectively). In some embodiments, IFSn is selected to be large enough to accommodate the time required to switch between channels, the maximum delay spread on CHn, as well as the receiver processing latency of a PPDU. In some embodiments, there is no explicit slot-guard governed by the propagation times; in fact, IFSn can be much smaller than the maximum propagation delay on CHn, e.g., tens of milliseconds vs seconds for the underwater acoustic channels. If the propagation delay of CH2 is expected to be significantly lower than that of CH1, IFS1 (413) may be chosen to be larger than the subsequent IFSs (415, 417, 419) to ensure S1 (412) arrives before the subsequent PPDU. Subsequent IFS durations can similarly be configured for expected differences in channel propagation times.

Without loss of generality all PPDUs in the example in FIG. 4 are assumed to have a common duration, S. The time-of-arrival (TOA) of the nth PPDU at the kth receiver is denoted by TOAnk. The TOAs of the PPDUs are estimated through receive processing, e.g., by correlating against pre-defined pilot and/or preamble sequences inserted into the PPDUs.

As shown in FIG. 4, a first receiver (RX1) of the slot detects the first PPDU (422) with TOA11+S<T (420-1). The residual time, $\Delta 11=T-(TOA11+S)$ (423) is large enough for RX1 to attempt to decode S1 before the slot expires. However, the subsequent PPDUs (Sn, n=2, 3, 4) are received with TOAn1+S>T, and cannot be processed by RX1.

The second receiver (RX2) shown in FIG. 4 experiences lower propagation delays across the channels as compared to the first receiver (RX1). Herein, the residual time $\Delta 12=T-(TOA11+S)$ is large enough for RX2 to attempt to decode the first PPDU, S1 (432) and also (if S1 is successfully decoded) to switch to CH2 to detect the second PPDU, S2 (434). If the residual time $\Delta 22=T-(TOA22+S)$ is large enough to process S2 and switch back to the primary channel (CH1) for the subsequent TDMA slot, RX2 decides to decode S2; otherwise S2 is not processed. Subsequent PPDUs (Sn, n=3, 4) are received with TOAn2+S>T, and cannot be processed by RX2.

The third receiver (RX3) shown in FIG. 4 experiences even lower propagation delays such that TOA13+S<TOA23+S<TOA33+S<T, such that RX3 may decode the first three PPDUs. The last PPDU (S4) the slot cannot be processed since TOA43+S>T.

Figure 5:
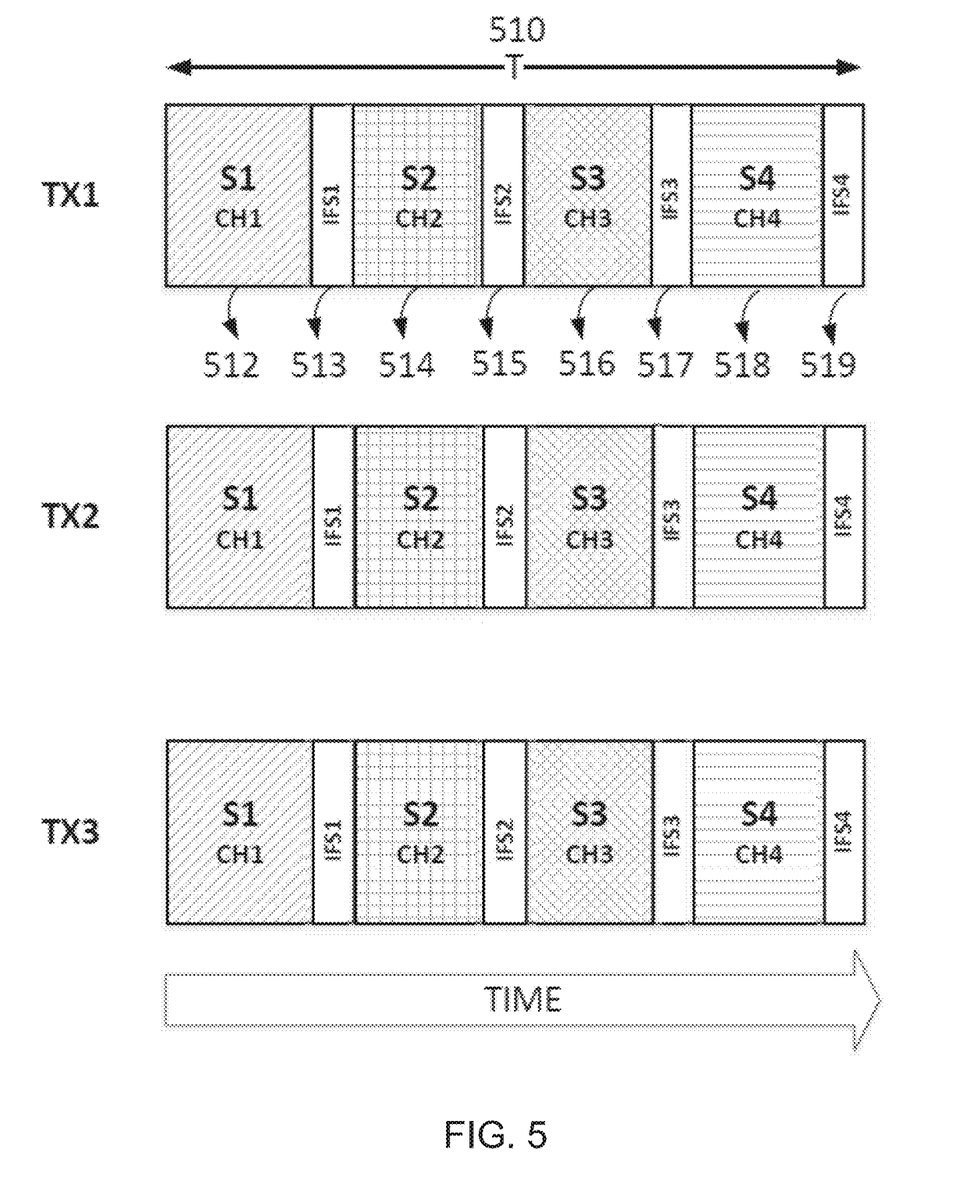
FIG. 5 shows an example of multiple cooperative transmitters simultaneously using different channels the same TDMA slot.

Embodiments of the disclosed technology may also be configured for waveforms with cooperative communication capabilities, for which there may be multiple transmitters of the same slot, and copies of this slot arrive at a particular receiver with different delays. In order to prevent interference between the PPDUs from multiple transmitters with different propagation delays, each PPDU of a transmitted slot uses a different channel, as illustrated in FIG. 5. As shown therein, S1 (512) is transmitted on CH1 followed by a first interframe spacing IFS1 (513), S2 (514) is transmitted on CH2 followed by a second interframe spacing IFS2 (515), and so on.

In some embodiments, and based on the maximum propagation delay, channels can be reused during the TDMA slot, e.g., CH3=CH1 and CH4=CH2.

According to some embodiments of the disclosed technology, the first PPDU can be used to transmit a first type of information or data, and the subsequent PPDU(s) can be used to transmit a second type of information or data. In an example, the first type of data and the second type of data are identical. In another example, the second type of data is different from the first type of data. Subsequent PPDU(s) can be used for one or more redundant transmissions of data, the transmission of error tolerant data, and to gain additional user capacity for short range links.

In some embodiments, subsequent PPDU(s) may be used for redundant transmissions based on not all links experiencing the maximum expected propagation delay. Receivers with smaller propagation delays may receive multiple copies of the same data within a TDMA slot, and combine these signals for improved reliability. This benefit may be particularly important with challenging channels that are subject to signal fading, such as underwater acoustic channels.

In some embodiments, subsequent PPDU(s) can be used for redundant transmission in a multi-hop Barrage Relay Network (BRN), e.g., as described in the context of FIG. 2. The Barrage Relay waveform realizes synchronous multi-hop cooperative relay as a part of MAC layer functions. The PPDU transmission sequence is associated with a descending propagation delay constraint: the first primary PPDU can be received by all links within the maximum propagation delay provisioned by the slot guard time. Each subsequent PPDU can only be received by receiver(s) subject to lower propagation delays. The successful detection & decoding of a PPDU depends on other factors such as transient channel errors. Thus, for BRN, the PPDU sequence automatically provides different multi-hop relay paths consisting of all links, or a subset of short (potentially more reliable) links. This can advantageously be leveraged to increase the end-to-end path diversity and reliability.

In some embodiments, subsequent PPDU(s) can be used for the transmission of error tolerant data. In an example, one type of error tolerant data is the Position Location Information (PLI) service that exists in many tactical waveforms. In another example, various Layer 2 control and management functions (including ranging and time tracking between 1-hop neighbors) are error tolerant. In traditional TDMA MAC, such information consumes their own time slots, whereas in the described embodiments, they may be advantageously disseminated via the secondary PPDU(s) without additional overhead.

In some embodiments, the subsequent PPDU(s) may be used to support additional user capacity for short range links. There are typical MANET network use cases in which the high propagation link(s) only exist in a single or a few long-haul links, while the majority of the nodes are in close proximity to their one-hop neighbors. When ranging information is available, a cognitive TDMA MAC may intelligently utilize additional PPDU(s) for majority of short distance traffic, providing long-range communications capability without losing the channel utilization efficiency.

Figure 6:
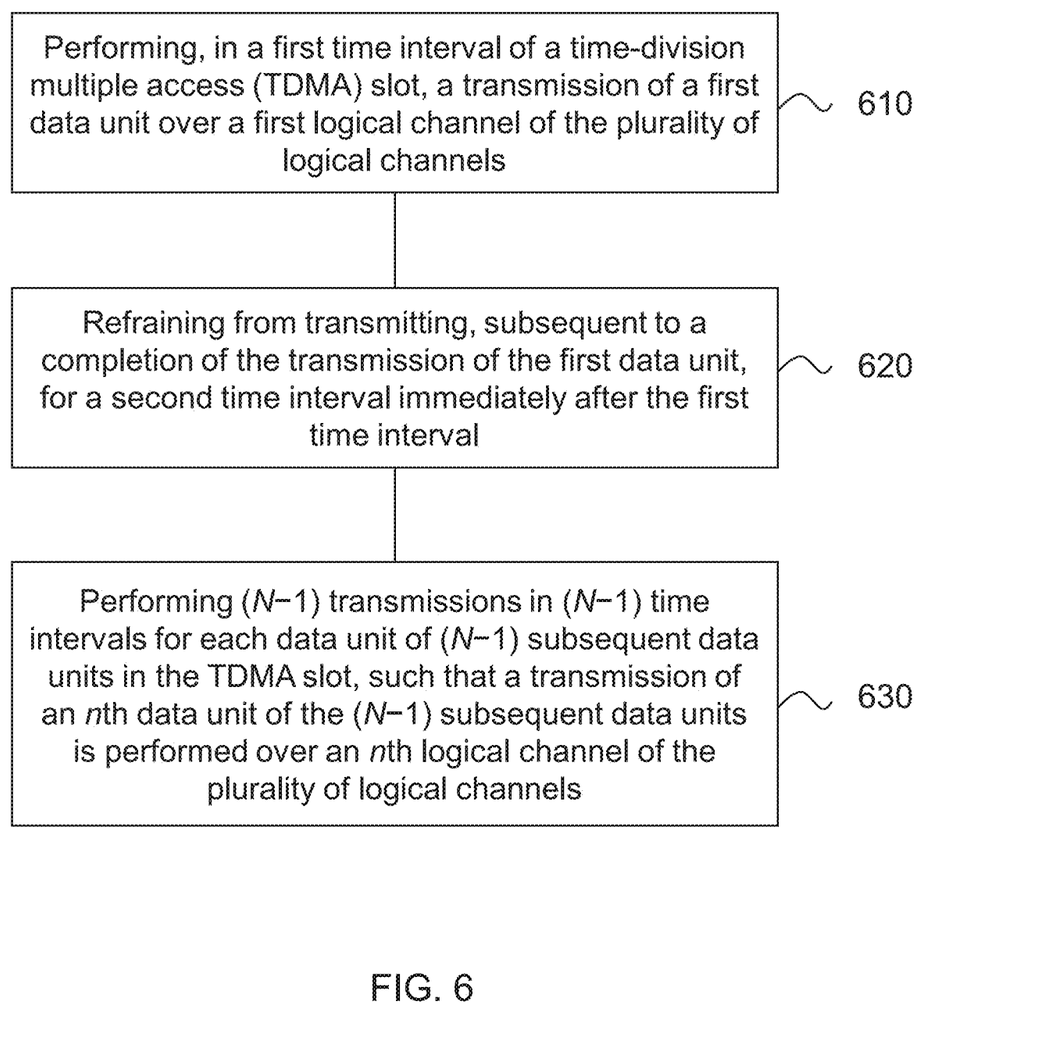
FIG. 6 shows a flowchart of an example method for wireless communication.

FIG. 6 shows a flowchart of an example method 600 for high-utilization low-latency multi-channel TDMA. The method 600 includes, at operation 610, performing, in a first time interval of a time-division multiple access (TDMA) slot, a transmission of a first data unit over a first logical channel of the plurality of logical channels. In an example, the transmission may use a constant envelope (CE) waveform, e.g., continuous phase modulation (CPM) or CE orthogonal frequency division multiplexing (CE-OFDM). In another example, the transmission may use OFDM with high-order quadrature amplitude modulation (QAM) constellations (e.g., 64-QAM and higher) to achieve a high data rate. In yet other example, the transmission may be more robust by using low-order QAM constellations (e.g., QPSK, 8-PSK).

The method 600 includes, at operation 620, refraining from transmitting, subsequent to a completion of the transmission of the first data unit, for a second time interval immediately after the first time interval. In an example, the first data unit may be S1 (412) or S1 (512) in FIGS. 4 and 5, respectively, and the corresponding second time interval may be IFS1 (413) and IFS1 (513), as shown in FIGS. 4 and 5, respectively.

The method 600 includes, at operation 630, performing (N−1) transmissions in (N−1) time intervals for each data unit of (N−1) subsequent data units in the TDMA slot, such that a transmission of an nth data unit of the (N−1) subsequent data units is performed over an nth logical channel of the plurality of logical channels. In some embodiments, n and N are positive integers and $2 \leq n \leq N$, each of the plurality of logical channels corresponds to a distinct transmission resource, the wireless medium is characterized by a maximum propagation delay, and a duration of the TDMA slot is greater than the maximum propagation delay. Operation 630 is shown, for example, in FIG. 4 for N=4, wherein S2, S3 and S4 are transmitted on CH2, CH3 and CH4, respectively, all within the same TDMA slot (410) of length T.

In some embodiments, the method 600 further includes the operation of performing, subsequent to the transmission of the nth data unit, a switching operation from the nth logical channel to a (n+1)th logical channel, wherein $2 \leq n \leq (N-1)$. As shown in the example in FIG. 4, subsequent to transmission of S2 (414), the switching operation (from CH2 to CH3) is performed in time duration denoted IFS2 (415).

In some embodiments, the distinct transmission resource comprises a frequency, an antenna direction, a polarization, or a code.

In some embodiments, the maximum propagation delay is greater than tens of milliseconds. In an example, the maximum propagation delay of tens of milliseconds is due to the wireless medium comprising a line-of-sight (LOS) airborne link over 100s of kilometers. In another example, the maximum propagation delay is due to the wireless medium comprising an underwater acoustic link with a relatively slow speed of wave propagation (e.g., ~1.5 km/sec).

In some embodiments, the second time interval is an intra-burst spacing (e.g., IFS1 denoted 413 and 513 in FIGS. 4 and 5, respectively).

In some embodiments, a duration of the intra-burst spacing is based on at least the maximum delay spread. In an example, the intra-burst spacing is selected to be large enough to include the switching time, the maximum delay spread, as well as the receiver processing latency of a data unit, which enables subsequent data units can be processed.

In some embodiments, data in each data unit of the N subsequent data units is identical to data in the first data unit. Transmitting redundant data increases the message completion rate (MCR) and/or decreases the bit error rate (BER) and packet error rate (PER).

In some embodiments, the first data unit comprises high-rate data, and wherein each data unit of the N subsequent data units comprises error tolerant data. In an example, the error tolerant data comprises position location information (PLI) or Layer 2 control and management functions, and the high-rate data comprises video or voice data. In another example, the error tolerant data employs a low-rate error correcting code (ECC), e.g., low-density parity check (LDPC) code. In yet another example, the high-rate data comprises information with a data rate on the order of several Megabytes (MBs), whereas the error tolerant data comprises information with a data rate on the order of a few kilobytes (kB).

In some embodiments, a duration of each of the (N−1) time intervals is identical to a duration of the first time interval. In an example, the durations may be identical when the N−1 subsequent data units are used to retransmit the data transmitted in the first data unit to achieve a high MCR or a lower BER/PER via redundant transmissions.

In some embodiments, a duration of each of the N−1 data units may be identical, but different from a duration of the first time interval. In an example, this may be the case when the first data unit is used for high-rate data and the subsequent data units are used for PLI data.

Figure 7:
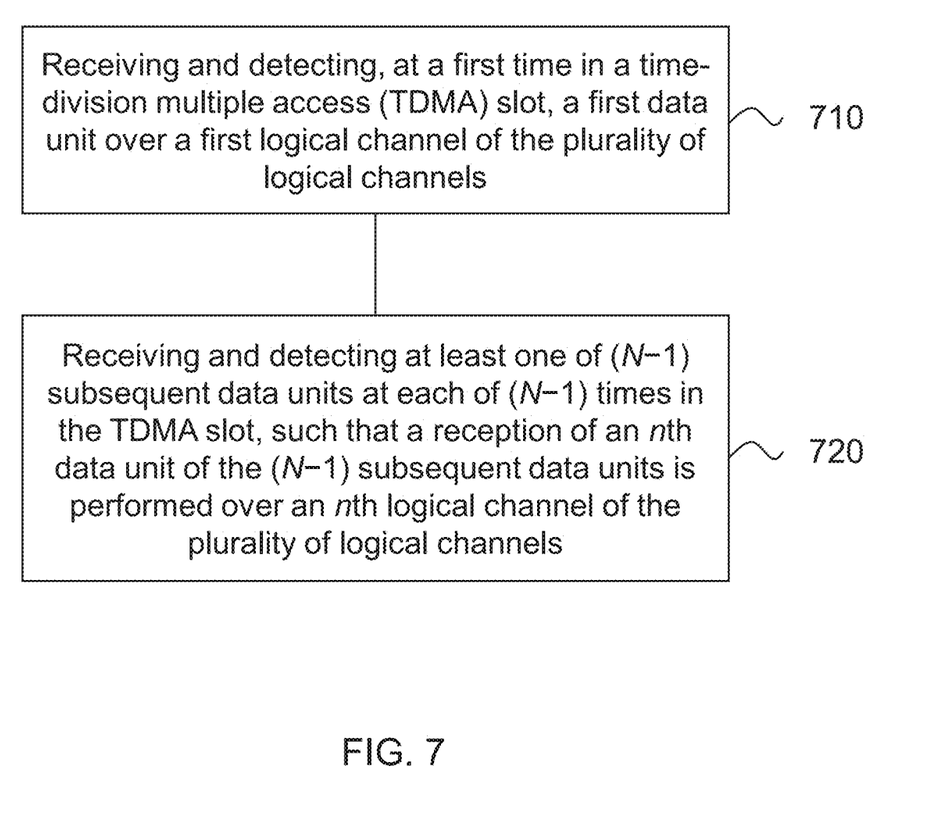
FIG. 7 shows a flowchart of another example method for wireless communication.

FIG. 7 shows a flowchart of another example method 700 for high-utilization low-latency multi-channel TDMA. The method 700 includes, at operation 710, receiving and detecting, at a first time in a time-division multiple access (TDMA) slot, a first data unit over a first logical channel of the plurality of logical channels.

The method 700 includes, at operation 720, receiving and detecting at least one of (N−1) subsequent data units at each of (N−1) times in the TDMA slot, such that a reception of an nth data unit of the (N−1) subsequent data units is performed over an nth logical channel of the plurality of logical channels. In some embodiments, n and N are positive integers and $2 \leq n \leq N$, each of the plurality of logical channels corresponds to a distinct transmission resource, the wireless medium is characterized by a maximum propagation delay, and a duration of the TDMA slot is greater than the maximum propagation delay.

In some embodiments, the method 700 further includes the operation of performing, subsequent to the reception of the nth data unit, a switching operation from the nth logical channel to a (n+1)th logical channel, wherein $2 \leq n \leq (N-1)$.

In some embodiments, detecting the first data unit is based on the first data unit comprising a predefined pilot sequence.

In some embodiments, the distinct transmission resource comprises a frequency, an antenna direction, a polarization, or a code.

In some embodiments, a number of the at least one of the (N−1) subsequent data units received and detected is based on a duration between the first time and an end of the TDMA slot.

According to embodiments of a disclosed technology, a wireless communication system includes a transmitter, a first receiver coupled to the transmitter over a wireless medium comprising a plurality of logical channels, wherein each of the plurality of logical channels corresponds to a distinct transmission resource, wherein the wireless medium is characterized by a maximum propagation delay, and wherein a distance between the transmitter and the first receiver corresponds to a first propagation delay that is less than the maximum propagation delay, and a second receiver coupled to the transmitter over the wireless medium, wherein a distance between the transmitter and the second receiver corresponds to a second propagation delay that is less than the first propagation delay, wherein the transmitter is configured to perform, in a first time interval of a time-division multiple access (TDMA) slot, a transmission of a first data unit over a first logical channel of the plurality of logical channels to the first receiver and the second receiver, refrain from transmitting, subsequent to a completion of the transmission of the first data unit, for a second time interval immediately after the first time interval, and perform (N−1) transmissions in (N−1) time intervals for each data unit of (N-1) subsequent data units in the TDMA slot, such that a transmission of an nth data unit of the (N-1) subsequent data units is performed over an nth logical channel of the plurality of logical channels, wherein the second receiver is configured to receive and decode, within the TDMA slot, at least one of the N subsequent data units, wherein the first receiver is unable to receive and decode each of the N subsequent data units, wherein a duration of the TDMA slot is greater than the first propagation delay, and wherein n and N are positive integers and $2 \leq n \leq N$.

In some embodiments, the first time interval greater than or equal to a sum of a time required to perform a switching operation between two of the plurality of logical channel, a maximum delay spread of the first logical channel, and a processing latency of the first data unit.

Figure 8:
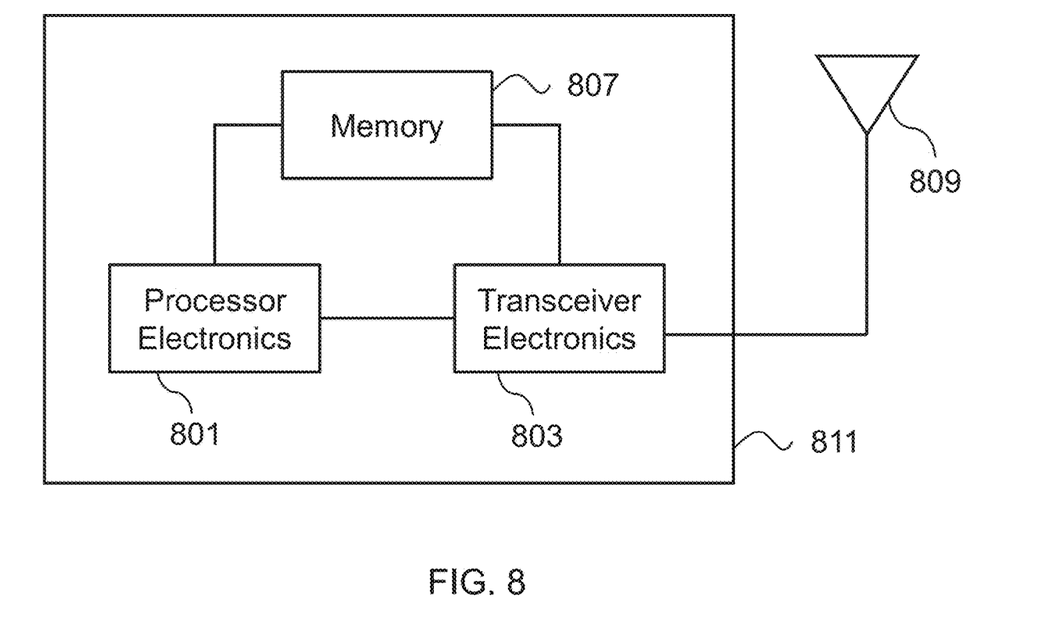
FIG. 8 is a block diagram representation of a portion of a radio that may be used to implement embodiments of the disclosed technology.

FIG. 8 is a block diagram representation of a portion of a radio, in accordance with some embodiments of the presently disclosed technology. A radio 811 can include processor electronics 801 such as a microprocessor that implements one or more of the techniques presented in this document. The radio 811 can include transceiver electronics 803 to send and/or receive wireless signals over one or more communication interfaces such as antenna(s) 809. The radio 811 can include other communication interfaces for transmitting and receiving data. Radio 811 can include one or more memories 807 configured to store information such as data and/or instructions. In some implementations, the processor electronics 801 can include at least a portion of the transceiver electronics 803. In some embodiments, at least some of the disclosed techniques, modules or functions (including, but not limited to, methods 600 and 700) are implemented using the radio 811.

Embodiments of the disclosed technology are directed to overcoming problems faced by traditional time-slotted MAC schemes operating in systems with large propagation delays. The timeslots in these systems are normally configured to account for the maximum propagation delay, which results in low utilization or high latencies.

An example technical solution described herein transmits multiple bursts on distinct channels within a single TDMA timeslot, with each transmitted burst being followed by a time duration in which the transmitter refrains from transmitting and switches to the channel for the next burst transmission. Multiple data units are transmitted on different channels within the same timeslot, which advantageously enables receivers close to the transmitter to receive and process several of the multiple data units, whereas receives further away from the transmitter will be able to receive and process at least the first data unit that was transmitted.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method for wireless communication over a wireless medium comprising a plurality of logical channels between a transmitter and at least one receiver, the method comprising:

performing, by the transmitter in a first time interval of a time-division multiple access (TDMA) slot, a transmission of a first data unit, over a first logical channel of the plurality of logical channels, to the at least one receiver;

refraining from transmitting, subsequent to a completion of the transmission of the first data unit, for a second time interval immediately after the first time interval; and performing (N-1) transmissions in (N-1) time intervals for each data unit of (N-1) subsequent data units in the TDMA slot, such that a transmission of an nth data unit of the (N−1) subsequent data units is performed over an nth logical channel of the plurality of logical channels, wherein n and N are positive integers and 2≤n≤N, wherein each of the plurality of logical channels corresponds to a distinct transmission resource, wherein a sum of the first time interval, the second time interval, and the (N−1) time intervals is less than or equal to a duration of the TDMA slot, and wherein the at least one receiver is configured to determine whether to receive and decode one or more of the (N−1) subsequent data units based on comparing a time-of-arrival (TOA) of the first data unit to an end of the TDMA slot.

2. The method of claim 1, further comprising:
performing, subsequent to the transmission of the nth data unit, a switching operation from the nth logical channel to a (n+1)th logical channel, wherein 2≤n≤(N−1).

3. The method of claim 1, wherein the distinct transmission resource comprises a frequency, an antenna direction, a polarization, or a code.

4. The method of claim 1, wherein the wireless medium is characterized by a maximum propagation delay that is (a) less than the duration of the TDMA slot, and (b) greater than tens of milliseconds.

5. The method of claim 1, wherein the second time interval is an intra-burst spacing.

6. The method of claim 5, wherein a duration of the intra-burst spacing is based on at least a maximum delay spread of the wireless medium.

7. The method of claim 1, wherein the wireless medium comprises a line-of-sight (LOS) airborne link or an underwater acoustic link.

8. The method of claim 1, wherein data in each data unit of the N subsequent data units is identical to data in the first data unit.

9. The method of claim 1, wherein the first data unit comprises high-rate data, and wherein each data unit of the N subsequent data units comprises error tolerant data.

10. The method of claim 9, wherein the error tolerant data comprises position location information (PLI) or Layer 2 control and management functions.

11. The method of claim 1, wherein a duration of each of the (N−1) time intervals is identical to a duration of the first time interval.

12. A wireless communication system, comprising:
a transmitter;
a first receiver coupled to the transmitter over a wireless medium comprising a plurality of logical channels, wherein each of the plurality of logical channels corresponds to a distinct transmission resource, wherein the wireless medium is characterized by a maximum propagation delay, and wherein a distance between the transmitter and the first receiver corresponds to a first propagation delay that is less than the maximum propagation delay; and
a second receiver coupled to the transmitter over the wireless medium, wherein a distance between the transmitter and the second receiver corresponds to a second propagation delay that is less than the first propagation delay,
wherein the transmitter is configured to:
perform, in a first time interval of a time-division multiple access (TDMA) slot, a transmission of a first data unit over a first logical channel of the plurality of logical channels to the first receiver and the second receiver,
refrain from transmitting, subsequent to a completion of the transmission of the first data unit, for a second time interval immediately after the first time interval, and
perform (N−1) transmissions in (N−1) time intervals for each data unit of (N−1) subsequent data units in the TDMA slot, such that a transmission of an nth data unit of the (N−1) subsequent data units is performed over an nth logical channel of the plurality of logical channels,
wherein the second receiver is configured to receive and decode, within the TDMA slot, at least one of the N subsequent data units, wherein the first receiver is unable to receive and decode each of the N subsequent data units, wherein a duration of the TDMA slot is greater than the first propagation delay, wherein n and N are positive integers and 2≤n≤N,
wherein a sum of the first time interval, the second time interval, and the (N−1) time intervals is less than or equal to a duration of the TDMA slot, and
wherein the first receiver or the second receiver is configured to:
receive, at a first time, the first data unit, wherein the first time corresponds to a time-of-arrival (TOA) of the first data unit at the first receiver or the second receiver, and
determine, based on comparing the TOA to an end of the TDMA slot, whether to receive and decode at least one of the (N−1) subsequent data units.

13. The system of claim 12, wherein size of the first data unit and a size of each of the (N−1) subsequent data units is identical.

14. The system of claim 12, wherein the first time interval greater than or equal to a sum of a time required to perform a switching operation between two of the plurality of logical channel, a maximum delay spread of the first logical channel, and a processing latency of the first data unit.

15. The system of claim 12, wherein the distinct transmission resource comprises a frequency, an antenna direction, a polarization, or a code.

16. A method for wireless communication over a wireless medium comprising a plurality of logical channels, the method comprising:
receiving and decoding, at a first time in a time-division multiple access (TDMA) slot, a first data unit over a first logical channel of the plurality of logical channels, wherein the first time corresponds to a time-of-arrival (TOA) of the first data unit;
comparing the TOA of the first data unit to an end of the TDMA slot; and
determining, based on the comparing, whether to receive and decode at least one of (N−1) subsequent data units at each of (N−1) times in the TDMA slot, such that a reception of an nth data unit of the (N−1) subsequent data units is performed over an nth logical channel of the plurality of logical channels,
wherein n and N are positive integers and 2≤n≤N, wherein each of the plurality of logical channels corresponds to a distinct transmission resource, and
wherein a duration between the first time and a last of the (N−1) times is less than or equal to a duration of the TDMA slot.

17. The method of claim 16, further comprising:
performing, subsequent to the reception of the nth data unit, a switching operation from the nth logical channel to a (n+1)th logical channel, wherein 2≤n≤(N−1).

18. The method of claim 16, wherein the decoding the first data unit is based on the first data unit comprising a predefined pilot sequence.

19. The method of claim 16, wherein the distinct transmission resource comprises a frequency, an antenna direction, a polarization, or a code.

20. The method of claim 16, wherein a number of the at least one of the (N−1) subsequent data units received and decoded is based on a duration between the first time and an end of the TDMA slot.

* * * * *